Feb. 20, 1945. E. M. DELORAINE ET AL 2,369,662

INTELLIGENCE TRANSMISSION SYSTEM

Filed June 5, 1943 7 Sheets-Sheet 3

INVENTORS
EDMOND M. DELORAINE
LOUIS A. DeROSA

BY

*ATTORNEY*

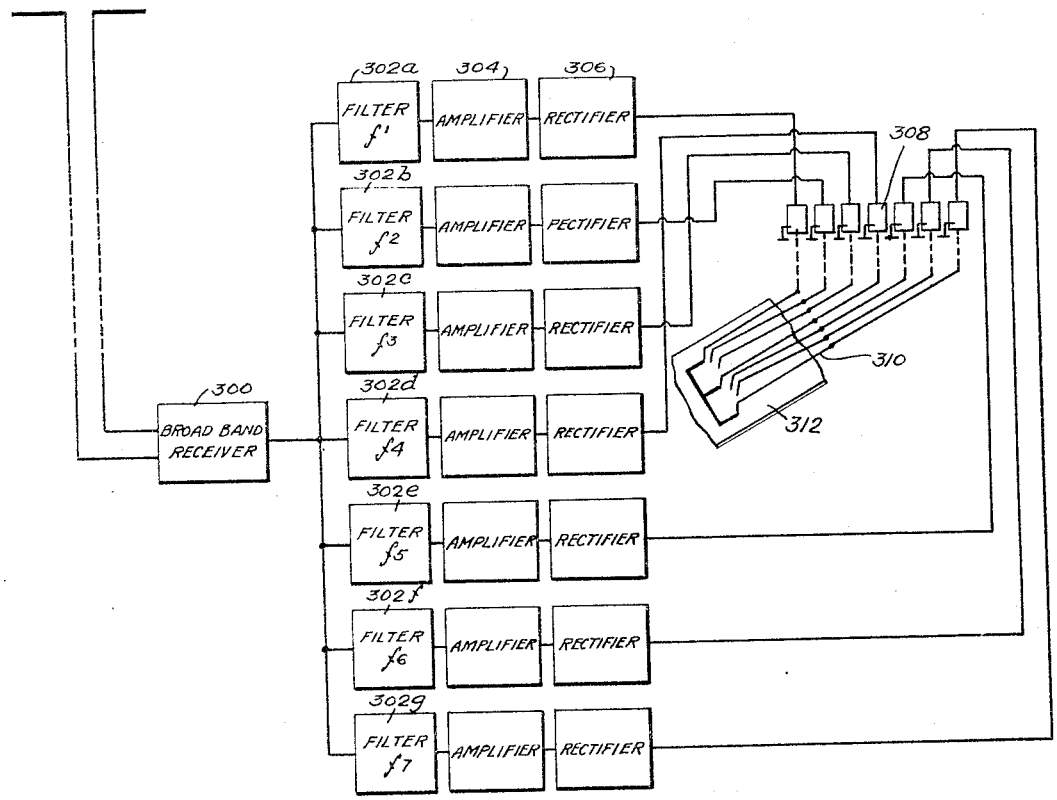
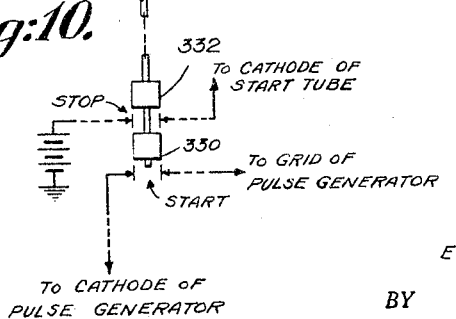

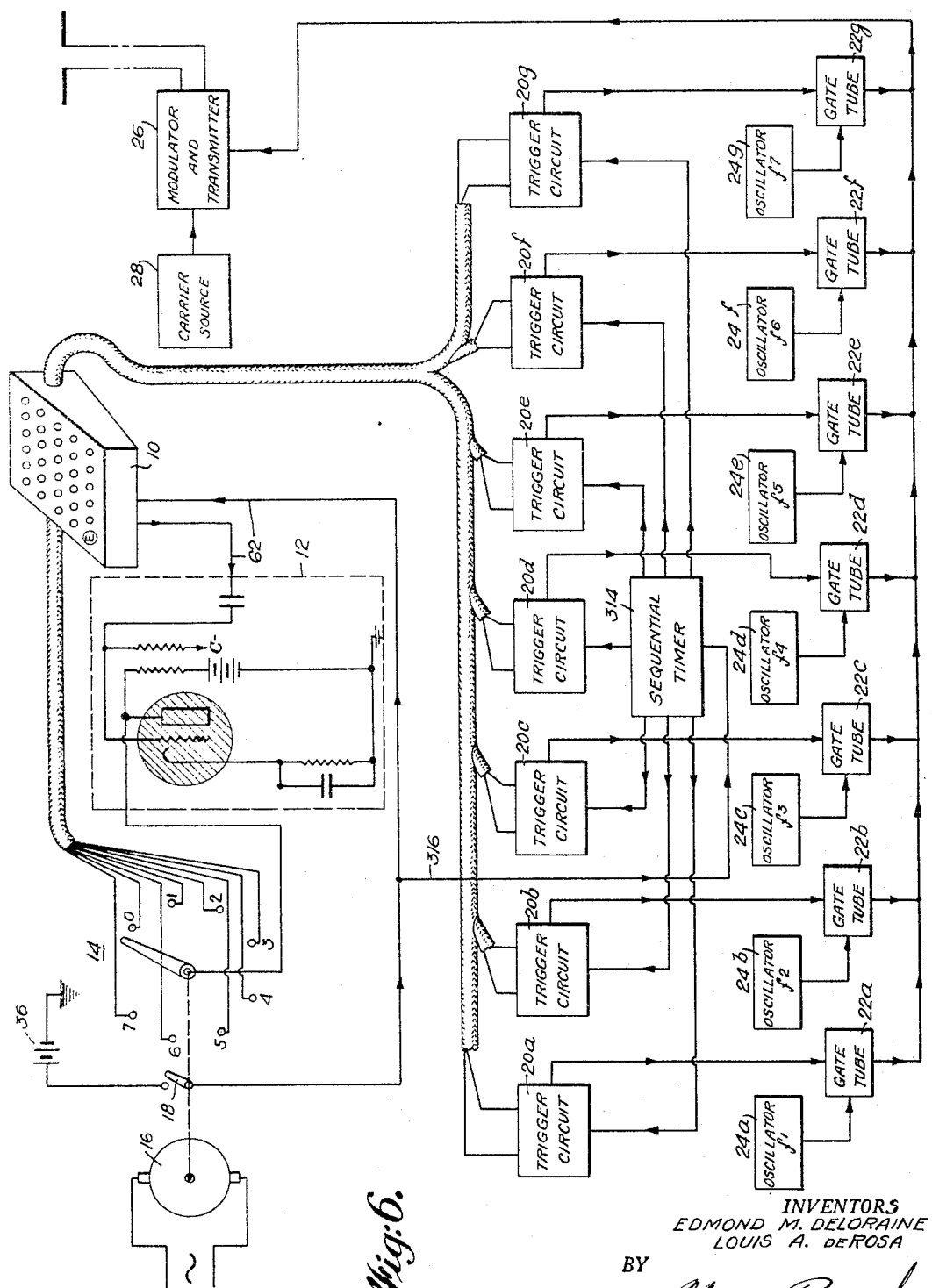

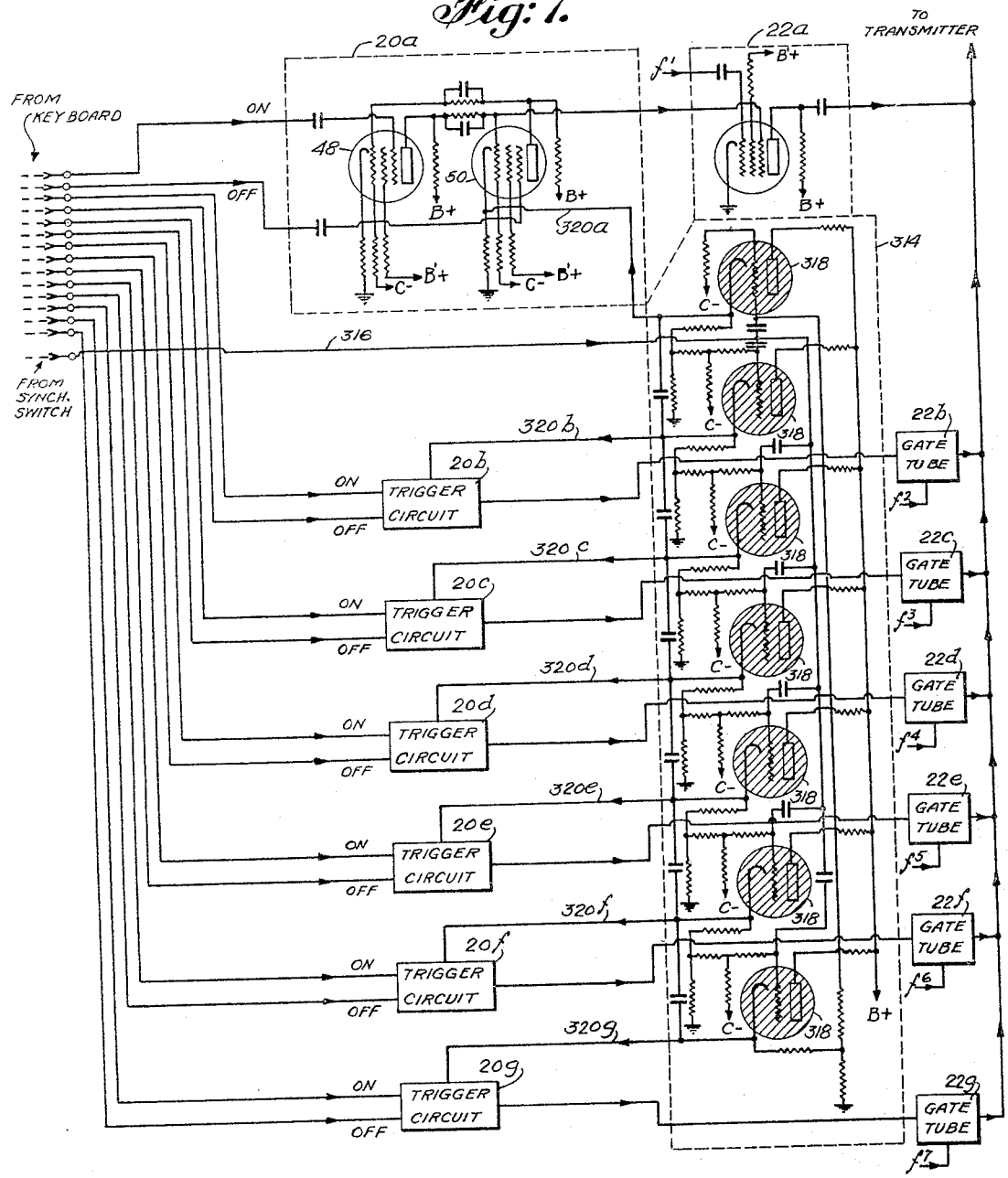

Feb. 20, 1945.   E. M. DELORAINE ET AL   2,369,662
INTELLIGENCE TRANSMISSION SYSTEM
Filed June 5, 1943   7 Sheets-Sheet 7
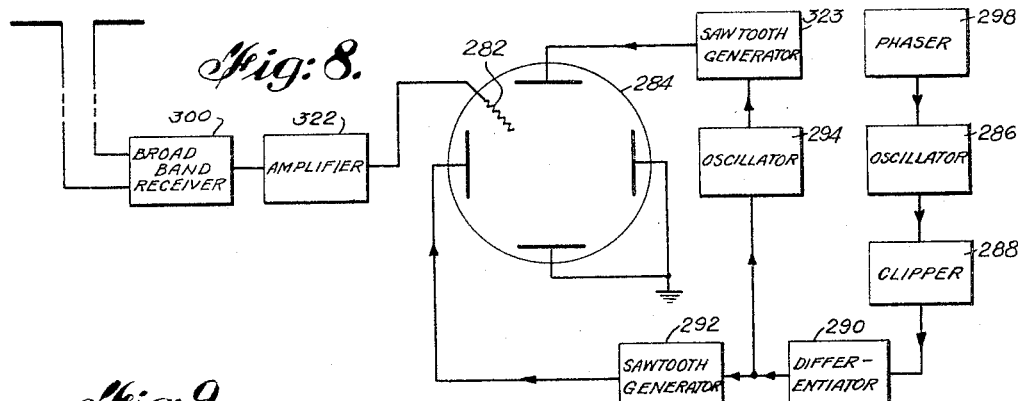
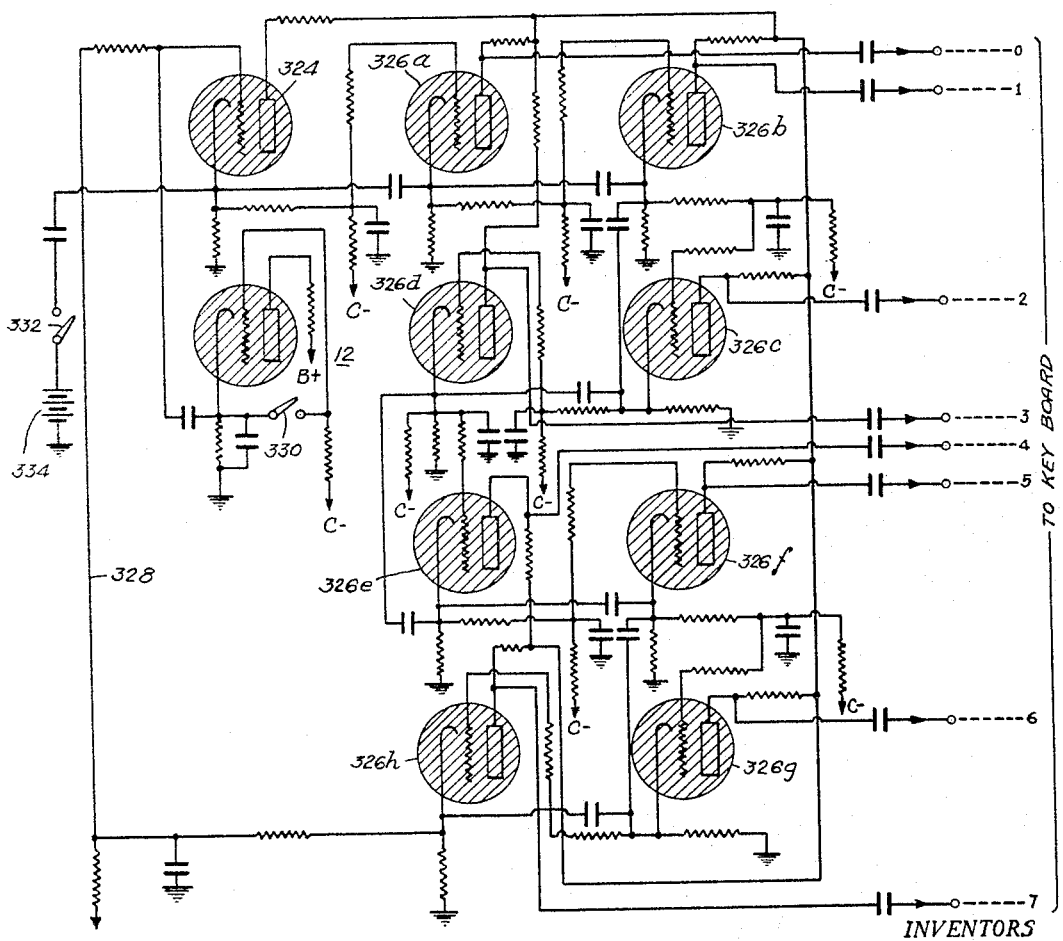
INVENTORS
EDMOND M. DELORAINE
LOUIS A. DE ROSA
BY
*[signature]*
ATTORNEY Patented Feb. 20, 1945

2,369,662

UNITED STATES PATENT OFFICE 2,369,662

INTELLIGENCE TRANSMISSION SYSTEM

Edmond M. Deloraine, New York, and Louis A. de Rosa, West Brighton, Staten Island, N. Y., assignors to Federal Telephone and Radio Corporation, Newark, N. J., a corporation of Delaware Application June 5, 1943, Serial No. 489,760

20 Claims. (Cl. 178—30)

This invention relates to improvements in intelligence transmission systems, and more particularly to systems in which intelligence is transmitted in the form of pulses, and received and converted into visual intelligence.

Systems have been heretofore proposed in which intelligence in the form of pulses or a series of pulses is transmitted directly or by carrier wave to a receiver where such pulses are converted into visual intelligence either by means of controlling the pattern on the screen of a cathode ray tube or by impressions upon a moving tape. In some systems the character to be transmitted is divided up into several transverse bands such as five or seven, of several groups of pulses each, the number and position of pulses in each band determining the formation of the transmitted character. The pulses may be sent at a common frequency, or, it is sometimes advantageous to transmit each band of pulses at different frequencies.

In all such systems the time interval between pulses or sets of pulses is determinative of the character to be reproduced at the receiver, and various means have been proposed to produce sets of such timed pulses in accordance with the characteristics of the intelligence to be transmitted, such as a letter or numeral. In prior systems it has been usual to pre-form patterns which, through the use of light-responsive tubes or similar means form series of pulses corresponding to the letter to be transmitted, the pattern chosen being controlled by a keyboard or similar means. Such systems and such means are used, for example, in the copending applications of Edmond M. Deloraine, S. N. 415,554, filed October 18, 1941, and Edmond M. Deloraine et al., S. N. 469,056, filed December 15, 1942.

It is one of the objects of the present invention to simplify the mechanical devices necessary in determining the interval between pulses forming a desired character and/or in certain instances to eliminate substantially all mechanical devices and utilize electric means for selecting the groups of pulses determinative of the character desired and also determine the interval between such pulses.

Another object of this invention is directed to the use of a plurality of trigger circuits for controlling the production of signal-signifying pulses, such trigger circuits being controlled, in turn, by relatively simple switch means interconnecting them with a plurality of controlling potential sources.

A further object of the present invention is directed to an intelligence transmission system in which the intelligence in the form of various bands of pulses, each band of a different frequency, is transmitted either simultaneously or sequentially.

Still another object of this invention is directed to a novel intelligence receiving and converting system in which a plurality of simultaneously received bands of pulses at different frequencies may be used to control and reproduce a character upon th screen of a cathode ray tube.

A still further object of the present invention is directed to an intelligence transmission system wherein a plurality of trigger circuits whose operation is controlled by a sequence of pulses applied in accordance with the characteristics of a signal to be transmitted, are sequentially operated to produce and transmit a sequence of signal-identifying bands of pulses.

Further objects and advantages of this invention will be apparent from consideration of the specification as illustrated by the accompanying drawings of possible embodiments of the invention, in which drawings:

Fig. 5 is a partially diagrammatic and partially block circuit diagram of a modified form of receiving system adapted to be used with the transmitting system illustrated in Figs. 1 and 2;

Fig. 6 is a circuit diagram, partially in block form of a modified form of intelligence transmitting system;

Fig. 7 is a detail circuit diagram of some of the circuit elements shown in block form in Fig. 6;

Fig. 8 is a block circuit diagram of a receiving system adapted to be used with the transmitting system illustrated in Figs. 6 and 7;

Fig. 9 is a circuit diagram of an electronic interval timer which may be used in place of the mechanical timer shown in Figs. 1 and 6; and Fig. 10 shows a form of control switch structure which may be used in connection with the electronic timer of Fig. 9.

Figure 1:
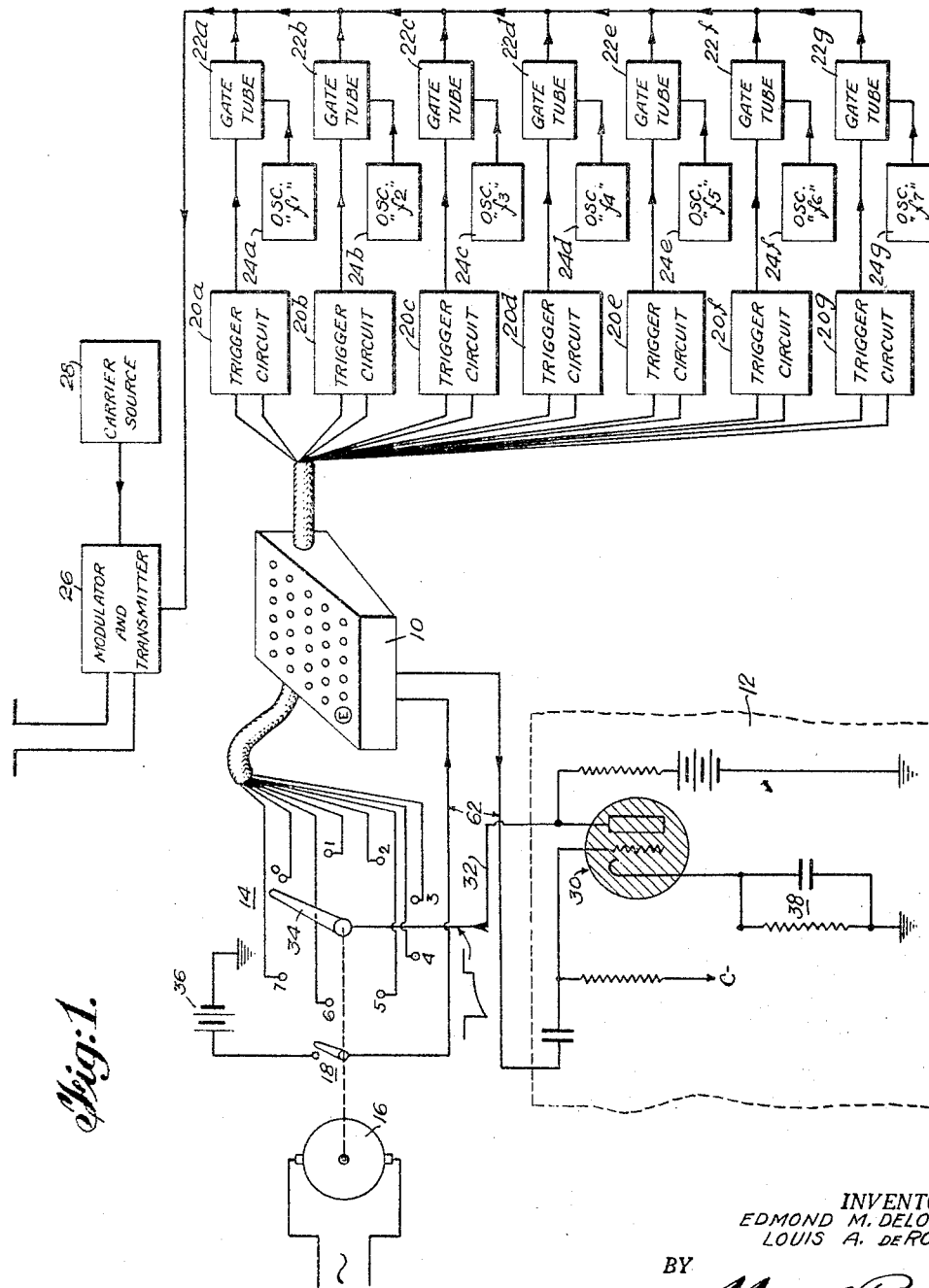
Fig. 1 is a circuit diagram, partially in block form, of a preferred form of signal-transmitting apparatus according to the present invention.

The general arrangement of a preferred form of intelligence determining and transmitting system according to the present invention is illustrated in Fig. 1. Such a system may include a suitable keyboard 10 which itself may be of well-known construction, the keys of which will have indicia marked thereon corresponding to the character or signal to be transmitted. A source of negative potential which may be in the form of a circuit generally indicated at 12 is applied to a rotary switch 14 whose stationary contacts "0" to "7" inclusive, lead to switching mechanism controlled by the keys and forming part of keyboard 10. The rotary switch 14 may be driven by a constant speed motor 16 which also drives a synchronizing switch 18 for periodically energizing the negative potential source 12.

From the keyboard 10, pairs of leads are connected to a plurality of trigger circuits 20a, 20b, 20c, 20d, 20e, 20f, 20g, the connections between these trigger circuits and the contacts of the rotary switch 14 being determined by the depressing of various keys of the keyboard 10. The trigger circuits 20a to 20g inclusive, are used to respectively control gate tubes 22a, 22b, 22c, 22d, 22e, 22f, 22g, to whose input are respectively connected oscillators 24a, 24b, 24c, 24d, 24e, 24f, and 24g.

In the preferred form of the present invention directed to a seven-frequency band transmission system, these oscillators will each produce currents at frequencies $f^1$ to $f^7$ respectively. The outputs of the gate tubes may be connected together as indicated, to modulate a transmitter 26 supplied by a carrier source 28.

It will be noted that as a preferred form of negative potential source, the circuit 12 may include a gas discharge tube, such as a triode 30 from whose anode circuit a lead 32 is connected to the rotating contact arm 34 of the rotary switch 14. A triggering potential in the form of a battery 36 is periodically connected to the grid of the tube 30 by the synchronizing switch 18 and so timed that the tube 30 is energized slightly before the arm 34 makes contact with the first of the contacts, namely the contact "0." In order that the negative potential source continues during the time the switch arm 34 contacts the individual contacts "0" to "7," the circuit 12 may include at the cathode circuit of the tube 30, a resistance-capacitance combination 38 which will produce a relatively slow decay in the negative potential appearing on the anode lead after the tube 30 has been energized by the battery 36. It will thus be seen that as the switches 18 and 34 are rotated, the tube 30 will be re-energized periodically to produce a negative potential which continues sufficiently long to be sequentially applied to the contacts numbered "0" to "7" inclusive.

As previously stated, the keys of the keyboard 10 are used to control switches by means of which the negative potentials appearing on the contacts of the rotary switch 14 are applied to the various trigger circuits 20a to 20g inclusive, for the purpose of producing pulsed signals in accordance with a character to be transmitted. As will be seen in Fig. 2, the keyboard 10 will include a plurality of keys 38, three of which have been illustrated by way of example. These keys are chosen for the purposes of illustrating the present invention, to correspond to keys for forming the letter "E," the numeral "2," and the letter "N." The key 38 for forming the letter "E" will control a plurality of switches, in this case seven, and respectively shown at 40a, 40b, 40c, 40d, 40e, 40f, 40g, which interconnect the leads "0" to "7" inclusive with the seven trigger circuits 20a to 20g inclusive. The key 38 for forming the numeral "2," is similarly formed with switches 42a, 42b, 42c, 42d, 42e, 42f, 42g, while the key for the letter "N" has similar switches 44a, 44b, 44c, 44d, 44e, 44f, 44g. Each of the keys 38 may be formed with an additional switch 46 for controlling the application of the synchronizing potential from the battery 36 to the grid of the tube 30. The reason for this additional switch is so that when a key is depressed, no negative pulses will appear on the contacts "0" to "7" inclusive until the switch arm is in a position to start the series in the proper order. For example, if a key is depressed while the contact arm 34 is in the vicinity of contact "2," no negative potentials will appear on any of the contacts until the synchronizing switch 18 has closed and energized the tube 30, so that when the negative pulses are applied to the trigger circuits through the switches on the key 38, such pulses will appear in proper order beginning with the first contact "0."

Figure 2:
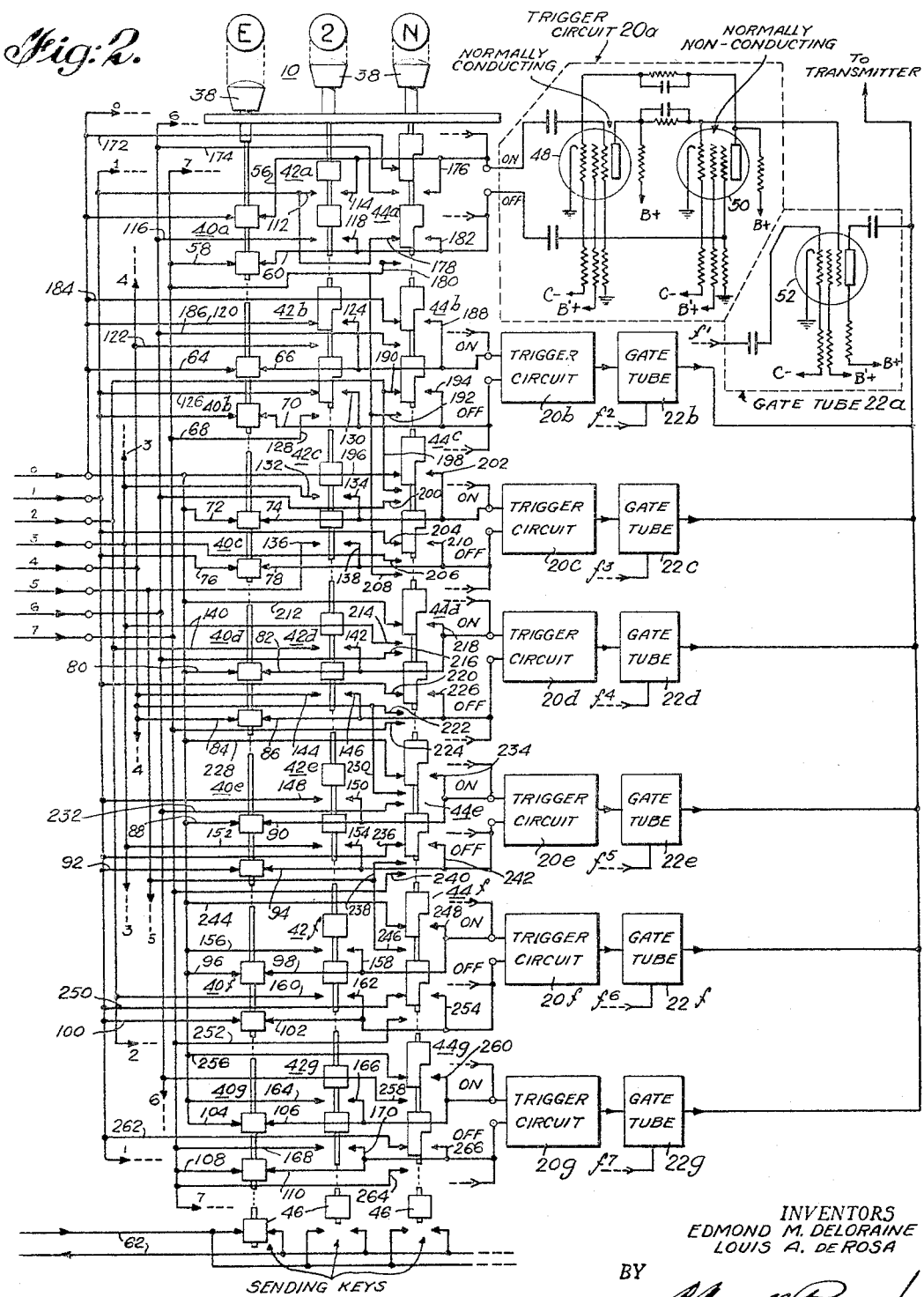
Fig. 2 is a partial detailed circuit diagram of some of the control elements shown in block form in Fig. 1.

The trigger circuits used in the present system are designed to be responsive solely to negative pulses. In Fig. 2 the trigger circuit 20a has been shown in some detail, it being understood that the remaining trigger circuits 20b, 20c, 20d, 20e, 20f, 20g, are the same as the trigger circuit 20a. This trigger circuit includes a pair of pentodes 48 and 50. The control grid of each tube is connected to the anode of the other tube by the usual coupling circuit. The input leads to the trigger circuits are in this case, respectively connected to the suppressor grids of the tubes. In accordance with the present invention one of the tubes, such as the tube 48, is rendered initially conducting, in which case the tube 50 will be normally non-conducting. The output from each trigger circuit is derived from the control grid of the tube 50. In this case the input to the suppressor grid of the tube 48 has been designated as the "on" lead while the input to the suppressor grid of the tube 50 has been designated as the "off" lead. It will be seen that if a negative potential is applied momentarily to the suppressor grid of the normally conducting tube 48, this tube will then become non-conductive while the tube 50 will then become conductive. This state of equilibrium is maintained until a negative potential or pulse is supplied to the suppressor grid of the tube 50, at which time this tube will become non-conductive and return the tube 48 to its conductive condition.

When the tube 50 is conductive, the output from its control grid is applied to the suppressor grid of a pentode 52 forming part of the gate tube circuit 22a, with which gate tube circuits 22b, 22c, 22d, 22e, 22f, 22g, are identical. Each gate tube is, as previously described, supplied with energy of a given frequency so that when this gate tube becomes conductive, current at a predetermined frequency is supplied to the transmitter.

Examples of the manner in which pulse-forming characters are derived from the circuit and means just described, will now be explained in more detail. If, for example, it is desired to form a letter such as the letter "E" in accordance with a seven-band system which has been chosen for purposes of illustration, it will be seen from a study of Fig. 4 "A" that it will be necessary to transmit a pulse at frequency $f^1$ for the period 0-7 inclusive; at the frequencies $f^2$ and $f^3$ for the period 0-1; at the frequency $f^4$ for the period 0-4; at the frequencies $f^5$ and $f^6$ for the period 0-1, and at the frequency $f^7$ for the period 0-7. Accordingly, when a key 38 corresponding to the letter "E" is depressed, the switches 40a to 40g inclusive will energize the trigger circuits 20a to 20g inclusive from the sequentially timed negative potential contacts "0" to "7" in a manner to produce pulses corresponding to the foregoing analysis of the latter. As shown in Fig. 2 when the key 38 corresponding to the letter "E" is depressed, the switch 40a completes a circuit to the trigger circuit 20a so that the lead corresponding to the contact "0" is connected to the "on" lead of this trigger circuit, through conductor 54, the upper portion of switch 40a, and the conductor 56, while the "off" lead of this trigger circuit is connected to the lead corresponding to contact "7" through conductors 58 and 60 and the lower portion of switch 40a. This will produce a pulse at frequency $f^1$ for the period 0-7. The switch 40b will connect from the "0" contact lead through conductors 64 and 66 and the upper portion of switch 40b to the "on" lead of trigger circuit 20b, and the "off" lead of trigger circuit 20b through conductors 68 and 70 and the lower portion of switch 40b to the lead corresponding to contact "1" of the rotary switch. The leads corresponding to contacts "0" to "1" of the rotary switch will be similarly respectively connected to the "on" and "off" leads of trigger circuits 20c through conductors 72 and 74 and the upper portion of switch 40c and the conductors 76 and 78 and the lower portion of switch 40c. The resulting energized gate tubes 22b and 22c will accordingly produce pulsed frequency bands $f^2$ and $f^3$ for the period 0-1. The trigger circuit 20d will have its "on" lead energized by a negative pulse from the lead corresponding again to the "0" contact of the rotary switch through conductor 80, the upper portion of switch 40d and conductor 82, while the "off" control lead of this trigger circuit will be connected to the lead corresponding to contact "4" through conductors 84 and 86 and the lower portion of switch 40d. This will produce through the gate tube 24d, a frequency band $f^4$ extending through the period 0-4. Trigger circuits 20e and 20f will be connected similarly to trigger circuits 20b and 20c, with the leads corresponding to the "0" and "1" contacts of the switch arm to produce pulsed frequencies $f^5$ and $f^6$ for the period 0-1. The circuit for the trigger circuit 20e may be traced to conductor 88, the upper portion of switch 40e and conductor 90 to its "on" lead, and conductor 92, the lower portion of switch 40e and conductor 94 to its "off" lead. The circuit for trigger circuit 20f may be traced through the conductor 96, the upper portion of switch 40f and conductor 98, to its "on" lead, and through conductor 100, the lower portion of switch 40f and conductor 102, to its "off" lead. Since it is desired that the frequency band $f^7$ extend across the entire period 0-7, similarly to the frequency band $f^1$, the trigger circuit 20g will be interconnected with the leads corresponding to the contacts "0" and "7," similarly to the trigger circuit 20a. The circuit may be traced through conductor 104, the upper portion of switch 40g and conductor 106 to the "on" lead, and through conductors 108, the lower portion of switch 40g and conductor 110 to its "off" lead.

The generation of pulses for other characters will follow a similar pattern as just outlined in connection with the pattern for the letter "E."

In other cases, however, the starting and stopping of the trigger circuit to cause a corresponding starting and stopping of the gate tube may have to be repeated several times for each frequency band. This, however, can be taken care of by a proper arrangement of circuit interconnections as determined by the switches operated by the individual keys. For example, in forming the numeral "2" in accordance with the pattern shown in Fig. 4 "B," it will be noted that for the frequency band $f^1$ it is desired to transmit signals during the period 1 to 6 inclusive, for the frequency band $f^2$ for the periods 0-1 and 4-7; for the frequency band $f^3$ during the period 3-5; for the frequency band $f^4$ during the period 2-4; for the frequency band $f^5$ during the period 1-3; for the frequency band $f^6$ during the period 0-2; and for the frequency band $f^7$ during the period 0 to 7 inclusive. The same trigger circuits and the same source of sequential negative potentials may be used to obtain this pattern, but in this case merely the switches are differently interconnected. As will be seen in Fig. 2, the key corresponding to the numeral "2" will, through the upper portion of switch 42a connect the lead corresponding to the contact "1" with the "on" lead of trigger circuit 20a through conductors 54 and 56, and the lead corresponding to contact "6" of the rotary switch with the "off" lead of this trigger circuit through conductors 58 and 60 and the lower portion of switch 42a for the frequency band $f^1$. For the frequency band $f^2$ the switch 42a connects the leads corresponding to both contacts "0" and "4" with the "on" lead of trigger circuit 20b through conductors 120, 122, the upper portion of this switch and common conductor 24, while leads corresponding to contacts "1" and "7" are connected to the "off" lead of this trigger circuit through conductors 126 and 128, the lower portion of this switch and the common conductor 130. For frequency band $f^3$ the switch 42c connects the lead corresponding to contact lead "3" with the "on" lead of trigger circuit 20, through conductors 132 and 134 and the upper portion of this switch, and the lead corresponding to contact "5" of the rotary switch with the "off" lead of this trigger circuit through conductors 136 and 138 and the lower portion of this switch. For frequency bands $f^4$, $f^5$, $f^6$ and $f^7$, the switches 42d, 42e, 42f and 42g, connect the proper leads of the rotary contactor with "on" and "off" leads of the respective trigger circuits 20a, 20e, 20f and 20g, through conductors 140, 142, 144, 146, 148, 150, 152, 154, 156, 158, 160, 162, 164, 166, 168 and 170, in a manner which can be readily traced as above, but which with the previous examples given need not be described in detail.

Figure 4:
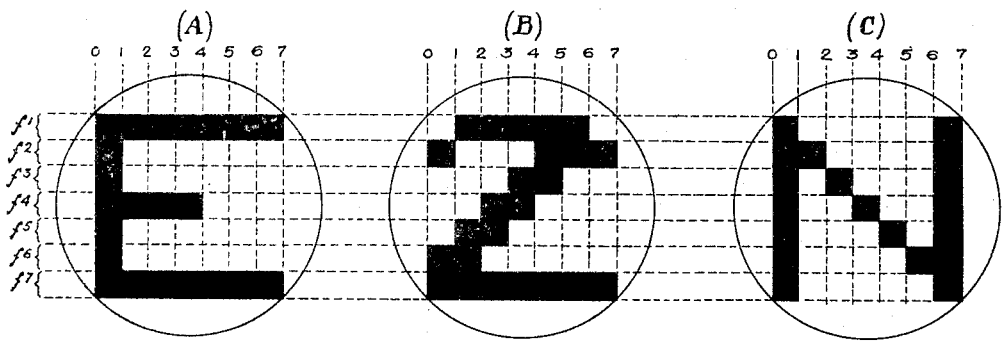
Fig. 4 shows examples of intelligence in the form of letters and numerals of the type which will be reproduced by the system illustrated in Figs. 1, 2 and 3.

Certain characters, for example, the letter "N" shown in Fig. 4 "C" may require as many as three start and stop controls for a single trigger circuit. This will be true, for example, for frequency bands $f^3$, $f^4$ and $f^5$. In such cases, it is merely necessary to increase the number of contacts on one side of the switch, as can be seen, for example, in both the upper and lower portions of switches 44c, 44d and 44e, operated by the key corresponding to this character. If it is desired to trace the circuits required for forming the letter "N" from the lead "0" corresponding to the contacts on the rotary switch to the "on" and "off" leads of the various trigger circuits, this may be done in the manner previously set forth, and in Fig. 2 the necessary circuits may be completed through conductors 172, 174, 176, 178, 180, 182, for the switch 44a; conductors 184, 186, 188, 190, 192, 194, for the switch 44b; conductors 196, 198, 200, 202, 204, 206, 208, 210, for the switch 44c; conductors 212, 214, 216, 218, 220, 222, 224, 226, for the switch 44d; conductors 228, 230, 232, 234, 236, 238, 240, 242, for the switch 44e; conductors 244, 246, 248, 250, 252, 254, for the switch 44f; and conductors 256, 258, 260, 262, 264, 266, for the switch 44g.

It will be noted that one of the advantages of the system just described lies in the fact that the trigger circuits are so designed as to be responsive solely to negative pulses, and will thus fail to operate for any di-phase effect encountered by chatter of the contactor arm. In addition, the negative pulse being only effective on the suppressor grid of the conducting tube will cause only one initial change of stability despite possible repetition of negative pulses on one tube, until a negative pulse is applied to the suppressor grid of its mate. Thus, chattering of the contactor arm cannot affect the operation of the circuits. The operation of the circuits following the rotary contactor is practically instantaneous, is reliable and should require no servicing during the life of the tube. The speed of transmission is controllable by varying the speed of the motor 18, while the length and number of intervals is solely determined by the number of spacings of the contacts.

Figure 3:
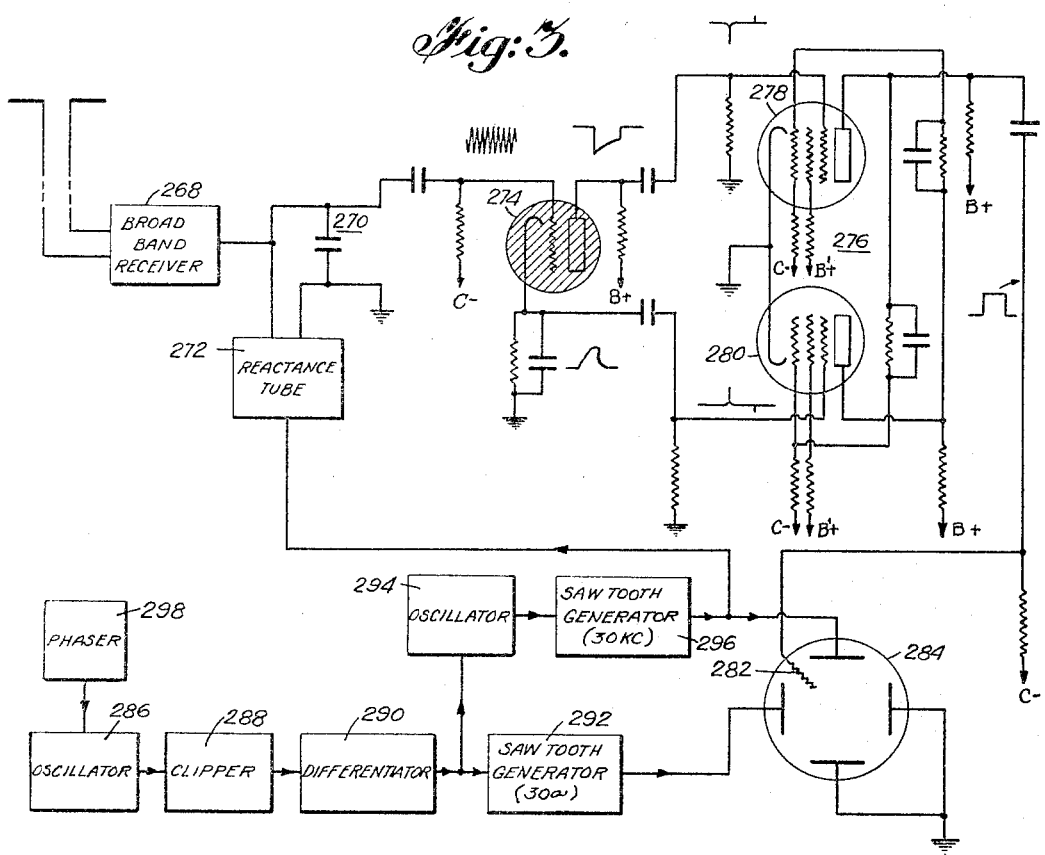
Fig. 3 is a circuit diagram, partially in block form, illustrating an intelligence receiving and converting system adapted to be used with the transmitting system illustrated in Figs. 1 and 2.

Since, in accordance with the manner of transmitting the pulsed character-determining signals by means of the circuits illustrated in Figs. 1 and 2, each frequency band may be (depending upon the form of the character) simultaneously energized and simultaneously transmitted, if the signals are to be converted into visual intelligence by means of a cathode ray tube the receiver must be provided with means for controlling the scanning of such a tube for the purpose of separating the signals on the different frequencies. An arrangement for receiving and converting such signals into visual intelligence upon the screen of a cathode ray tube is illustrated in Fig. 3. This receiver includes a suitable broad band receiving apparatus 268 having a tuning circuit 270 tunable over the range of frequency $f^1$—$f^7$ of the transmitter. In accordance with the present invention the output from this tunable circuit 270 controls the grid of a gas filled tube 274 from whose anode and cathode are derived control potentials for a trigger circuit 276 consisting of a pair of pentodes 278 280. The output of one of the pentodes 278 is connected to the control grid 282 of the cathode ray tube 284. Horizontal travel of the cathode ray beam may be controlled from an oscillator 286 which through a clipper 288, a differentiator 290 and generator 292, supplies a saw-tooth wave of, for example, 30 cycles to the horizontal plates of the cathode ray tube. The differentiator 290 may also key a second oscillator 294 controlling a saw-tooth wave generator 296 of, for example, 30,000 cycles applied to the vertical beam-scanning plates. These two scanning sources will, therefore, combine to move the beam of the cathode ray tube slowly across the face of the screen but rapidly up and down. A phaser 298 may be used to control the oscillator 286 so that the picture of the received character may be properly positioned on the screen of the cathode ray tube. The high frequency generator 296 may also be used to control a reactance tube 272 connected across the tuned circuit 270 for the purpose of scanning this tuned circuit at a frequency corresponding to the frequency of the vertical scanning wave of the cathode ray tube. Thus, when signals on frequency bands $f^1$ to $f^7$ are simultaneously received, the circuit 270 will be sequentially tuned over this frequency band at an extremely rapid rate corresponding to the vertical scanning frequency of the cathode ray tube 284. Through the control tube 274 and the trigger circuit 276, the control grid 282 will only permit a signal on the screen when a signal at the frequency which is being instantaneously scanned is being received. Thus, as the horizontal scanning of the cathode ray tube moves relatively slowly across the screen, the grid 282 will produce on the screen a pattern built up of series of short partial pulses whose horizontal position is determined by the low frequency generator 30 and whose vertical position is determined by the high frequency generator 296 and which, due to rapid scanning of the tuning circuit 270 will, furthermore, only appear when a signal is at a predetermined frequency and at a time correlated with the position of the vertical scanning wave.

In cases where the signal is not to be reproduced on a cathode ray tube, it may not be necessary to provide means for varying the tuning. For example, in Fig. 5 I have illustrated a receiver which may be used in connection with the transmitter illustrated in Figs. 1 and 2 in which the signal is reproduced upon a moving tape 312. In this case, the output from a broad band receiver 300 is applied through filters 302a, 302b, 302c, 302d, 302e, 302f, 302g, corresponding to frequencies $f^1$ to $f^7$ respectively and thence through suitable amplifiers 304 and rectifiers 306, to individual relays 308 operating separate pencils or other marking devices 310. Since in this case it is in fact preferable, that the individual pencils be simultaneously operated, the fact that the transmitter may transmit various signal pulses simultaneously has no adverse effect and requires only simple apparatus where printing or recording of the transmitted connection on the tape is desired.

In the modified system illustrated in Figs. 6 and 7, means are provided for sequentially transmitting the various frequency bands rather than transmitting them simultaneously, as previously described. The modified system includes all of the elements such as the switch-operating keyboard 10, the negative potential circuit source 12, rotary switch 14, synchronizing switch 18, motor 16, trigger circuits 20a, to 20g inclusive, corresponding gate tubes 22a to 22g inclusive, fed by oscillators 24a to 24g inclusive and modulator and transmitter 26 fed from carrier source 28. In addition, however, a sequential timer 314 is used to sequentially operate the trigger circuits, and the latter will, in this case, be normally biased to an inoperative condition despite the fact that they are fed with negative pulse patterns from the switches operated by the keyboard 10. The sequential timer 314 is triggered by the synchronizing switch 18, as through conductor 316, so that the trigger circuits will be sequentially energized simultaneously with the operation of the rotary switch 14. In Fig. 7 the sequential timer 314 is shown in more detail, together with its interconnection with the various trigger circuits 20a to 20g inclusive. The sequential timer 314 may consist of a well-known type of counter circuit, including a plurality of gas-filled tubes 318, interconnected in a known manner so that the reception of an energizing pulse through the conductor 316 starts operation of the first tube of the series which, after a period of time becomes de-energized and automatically prepares the second tube of the series for energization upon reception of the next energizing pulse. The control of the trigger circuits by the sequential timer is preferably effected by deriving a biasing voltage from the cathode of a timer tube and which upon becoming conductive applies a potential to the cathode of the second trigger tube to permit the same to become conductive when the first trigger tube becomes non-conductive, in a manner previously described. It will be noted that the negative pulses derived from a rotation of the rotary switch 14 are applied to the first trigger circuit 20a, the next set of negative pulses to the trigger circuit 20b, etc. Thus, it will require seven full rotations of the rotary switch 14 to complete the formation of a character, whereas in the system previously described in which all of the trigger circuits were simultaneously energized, one rotation of the rotary switch would complete the transmission of a single character; in practice, however, even in the first case it is desirable to keep a controlling key depressed for sufficient length of time to permit several rotations of the rotary switch in order to repeat the series of pulses a sufficient number of times to produce a clear identifiable character upon the cathode ray tube of the receiver.

Where the character-forming signals are sequentially transmitted as in a system illustrated in Figs. 6 and 7, tuning scanning means such as provided in the receiver illustrated in Fig. 3 need not be used and the receiver may thus be simplified. Such a receiver for use with a transmitting system illustrated in Figs. 6 and 7 is shown in Fig. 8 and may include a broad band receiver 300 acting through an amplifier 322 directly upon the control grid 282 of the cathode ray tube 284. A horizontal sweep voltage may be derived from an oscillator 286 acting through a clipper 288 and a differentiator 290 upon a relatively low frequency saw-tooth generator 292, while the vertical sweep voltage may be derived from an oscillator 294 keyed to act in synchronism with the generator 292 and operating a second saw-tooth generator 323 which need not, in this case be of as high a frequency as the saw-tooth generator 296 in Fig. 3. A phaser 298 may be used to control the oscillator 286 so that the picture of the received character may be properly positioned upon the screen of the cathode ray tube.

It is also possible, in accordance with the system of the present invention, to eliminate all rotating switch mechanisms and use an electronic counter circuit for determining the interval between negative pulses. Such an alternative arrangement is illustrated in Fig. 9 in which gas-filled tubes 326a, 326b, 326c, 326d, 326e, 326f, 326g, 326h, interconnected in a known counter arrangement may provide a series of timed negative potentials on leads "0," "1," "2," "3," "4," "5," "6," "7," corresponding to the leads connected to the same contacts derived from the rotary switch 14 in Figs. 1 and 6. The action of the counter circuit of Fig. 9 may be initiated from a negative potential source 12 similar to that previously described, acting upon a gas-filled tube 324, from which is derived a starting potential for the first tube 326a of the counter series. A starting switch 330 which may be actuated by the closing of any character-forming key, as shown in Fig. 10 may be used to start the counter circuit when any one of these keys are depressed, interconnecting the leads "0" to "7" inclusive with the corresponding trigger circuits in the manner previously described. Closure of the switch 330 starts the operation of the sequentially acting counter system in a manner well-known to the art, and this action will continue until a biasing potential on the cathodes of the counter mechanism is removed. This biasing potential may be supplied by a battery 334 acting through a switch 332 on the grid of the first counter tube 326a. The switch 332 may be closed simultaneously with the switch 330 upon the depression of any key as shown in Fig. 10. When the character-forming key is raised, the switch 332 will open, removing the required potential on the grid of the tube 326a and stopping the operation of the electronic counter after the last tube of the series has operated. It will, of course, be understood that the system illustrated in Fig. 9 can be used in either of the systems shown in Figs. 1 and 6 in place of the rotary contactor 14.

Certain details of construction which will be obvious to those skilled in this art have not been minutely described since they themselves are not considered to form any part of the present invention. For example, the details of the keyboard 10 have not been illustrated. This keyboard may embody the features of usual keyboards known to the art in which for example, the depression of one key automatically releases a key already depressed, so that special releasing means for each key are not necessary. Of course, additional means will be provided for releasing a depressed key without pressing some other character-forming key. While I have illustrated in Fig. 2 the addition of a separate switch for each key to connect the synchronizing switch 18 with the negative potential source 12, it will be understood that this may be in the form of a separate "sending key" if desired, and likewise the switches 330 and 332 to be embodied in a system where an electronic counter is used, as in Fig. 9, may be either separate or operated by each individual key. Furthermore, while we have illustrated as an example of this invention a keyboard in which the keys directly operate switches for interconnecting the sequential negative pulses with the various trigger circuits, it will be understood by those skilled in this art that the individual keys may actuate relays for accomplishing this indirectly instead of directly. The form of switch mechanism illustrated has only been given by way of example, and it is not intended that this invention be limited to any particular type of key-operated switch mechanism.

It is also to be understood that while our system is shown in connection with the transmission of the intelligence through a radio carrier, the system is equally applicable to the transmission of this intelligence by wire either as a modulated carrier system or, where a plurality of frequencies is used, one for each line, these signal frequencies could be transmitted directly over a single line or by separate direct lines.

In systems where the trigger circuits are sequentially energized as in Figs. 6 and 7 it will, of course, be obvious to those skilled in this art that it is unnecessary to use a different frequency for each line of the connection. In other words, the oscillator 24a to 24g inclusive, in the system of Figs. 6 and 7, could all operate on the same frequency, or the gate tubes 22a to 22g inclusive could be energized by a common oscillator. It will also be clear to those skilled in this art that where sequential operation is used it would not be necessary to transmit the signals in the form of pulses of high frequencies, but simple pulses directly produced by the trigger circuits would give the desired result. In this case the gate tubes would not be necessary, and it is also possible that the gate tubes could be eliminated in the high frequency pulse system by applying the oscillator directly to the output of the trigger circuits rather than through the intermediation of the gate tubes.

No means have been illustrated for definitely synchronizing the receivers with the transmitters in the systems above described. Such synchronization is not necessary in most cases and a mere adjustment of the scanning voltage by a phaser as described, to bring the picture of the character to the center of the screen is usually sufficient. However, if positive synchronization is desired, this may be effected by the transmission and reception of an additional synchronizing pulse in a manner known to the art.

Accordingly, while we have shown and described several embodiments of our invention, it is to be understood that it may be embodied in other forms without departing from the principles thereof. Accordingly, it is contemplated that changes and modifications may be made by those skilled in this art without departing from the invention as defined in the objects and the following claims.

We claim:

1. In a system for the transmission of intelligence, the combination of means for generating pulsed signals in accordance with the intelligence to be transmitted, comprising a plurality of trigger circuits each having a starting, stopping and output circuit, transmitting means connected to the outputs of said trigger circuits for transmitting the pulsed signals produced by the starting and stopping of said trigger circuits, and means controlling said trigger circuits, said means including means for deriving a plurality of sequentially timed pulses, and switching means for applying said pulses to the starting and stopping circuits of the individual trigger circuits in accordance with the intelligence to be transmitted.

2. The combination according to claim 1, in which said transmitting means includes a plurality of gate tubes, one for each trigger circuit, means for controlling each gate tube by one of said trigger circuits, and oscillator means connected to the inputs of said gate tubes.

3. The combination according to claim 1, in which said switching means comprises a keyboard provided with a plurality of control keys each having indicia thereon corresponding to a character to be transmitted, and switches intermediate said pulse deriving means and said trigger circuits, operated by said keys.

4. The combination according to claim 1, in which each trigger circuit comprises a pair of pentodes, one of which is biased to be normally conductive and the other of which is biased to be normally non-conductive, coupling means interconnecting the control grid of each tube with the anode of the other tube, said starting circuit including means for applying the negative pulses to the suppressor grid of the one, normally conductive tube for rendering the same non-conductive and thereby rendering the other tube conductive, and the stopping circuit including means for applying the negative pulses to the suppressor grid of the other tube for rendering the same nonconductive and thereby rendering the one tube conductive, said output circuit including means connected to the control grid of the other tube.

5. In a system for the transmission and reception of intelligence, the combination of means for generating pulsed signals in accordance with the intelligence to be transmitted, comprising a plurality of trigger circuits each having a starting, stopping and output circuit, transmitting means connected to the outputs of said trigger circuits for transmitting the pulsed signals produced by the starting and stopping of said trigger circuits, and means controlling said trigger circuits, said last-mentioned means including means for deriving a plurality of sequentially timed negative pulses, switching means for applying said negative pulses to the starting and stopping circuits of the individual trigger circuits in accordance with the intelligence to be transmitted, said transmitting means including a plurality of gate tubes, one for each trigger circuit, means for controlling each gate tube by its corresponding trigger circuits, and a plurality of high frequency oscillators, one connected to the input of each gate tube, the frequency of each oscillator being different whereby the pulse signals produced by each gate tube will be at a different frequency, and a receiver, said receiver including means converting the received pulsed signals into visual intelligence, means receiving the different frequency signals, and means separately applying the different frequency pulses to said intelligence converting means.

6. In a system for the transmission of intelligence, a plurality of trigger circuits each having a starting, stopping and output circuit, transmitting means connected to the outputs of trigger circuits and actuated by the starting and stopping thereof, and means controlling said trigger circuits, said last means including means for deriving a plurality of sequentially timed negative pulses, and switching means for applying said negative pulses to the starting and stopping circuits of the individual trigger circuits in accordance with the intelligence to be transmitted.

7. The combination according to claim 6, in which said negative pulse deriving means comprises a negative potential source, a rotary switch arm connected to said negative potential source, a plurality of spaced switch contacts adapted to be sequentially contacted by said switch arm and connected to said switching means, and means for rotating said switching arm.

8. In a system for the transmission of intelligence, a negative potential source, a plurality of trigger circuits each having a starting and stopping circuit, a plurality of gate tubes respectively controlled by said trigger circuits, oscillator means connected to said gate tubes, a transmitter circuit connected to the outputs of said gate tubes, and means controlling said trigger circuits from said negative potential source, said last means including first switching means having a plurality of output circuits and means for sequentially energizing said output circuits from said negative potential source, and second variable switching means interconnecting said output circuits with the starting and stopping circuits of the individual trigger circuits in accordance with the intelligence to be transmitted.

9. The combination according to claim 8, in which each of said trigger circuits comprises a pair of pentodes, one of which is biased to be normally conductive and the other of which is biased to be normally non-conductive, coupling means interconnecting the control grids of each tube with the anode of the other tube, said starting circuit including means for applying the negative potential to the suppressor grid of the one, normally conductive tube for rendering the same nonconductive and rendering the other tube conductive and the stopping circuit including means for applying the negative potential to the suppressor grid of the other tube for rendering the same non-conductive and rendering the one tube conductive, in combination with a control output circuit leading to the corresponding gate tube and derived from the control grid of the other pentode.

10. The combination according to claim 8, in which said first switching means comprises a rotary contact arm connected to said negative potential source, a plurality of spaced contacts adapted to be contacted by said arm and respectively connected to the individual output circuits, and means for rotating said contact arm.

11. The combination according to claim 8, in which said second switching means comprises a keyboard provided with a plurality of control keys each having indicia thereon corresponding to a character to be transmitted, and switches intermediate said output circuits and said trigger circuits operated by said keys.

12. In a system for the transmission of intelligence, means for producing a negative potential over a predetermined period, a plurality of trigger circuits each having a starting, stopping and output circuit, common transmitting means connected to the outputs of said trigger circuits and adapted to be energized thereby, and means controlling said trigger circuits, said means including first switching means comprising a rotary contact arm connected to said negative potential source, a plurality of spaced contacts adapted to be sequentially contacted by said arm, a plurality of output circuits, one leading from each contact, means for rotating said contact arm, means for periodically energizing said negative potential source once for each complete rotation of said contact arm, a keyboard having a plurality of keys provided with indicia corresponding to a character to be transmitted, a plurality of switch means controlled by said keys for interconnecting said output circuits with the starting and stopping circuits of said trigger circuits and thereby applying to them variously timed negative potentials in accordance with the character desired, and other switch means on said keyboard connecting the periodically operated energized means to said negative potential source.

13. In a system for the transmission and reception of intelligence, the combination of means generating pulsed signals corresponding to the intelligence to be transmitted comprising means generating a series of sequentially timed negative pulses, a plurality of trigger circuits each having a starting, stopping and output circuit, a corresponding plurality of oscillators, each adapted to produce a signal at a different frequency, means for controlling each oscillator by a trigger circuit, transmiting means for transmitting the signals from said oscillators, a keyboard having a plurality of keys provided with indicia corresponding to a character to be transmitted, a plurality of switch means controlled by each key for simultaneously interconnecting said output circuits with said trigger circuits and thereby applying to them variously timed negative potentials in accordance with the character desired, whereby said oscillators, separately or simultaneously, may produce signals at different frequencies, corresponding to the character desired, a receiver for said signals, said receiver including a tuned circuit tunable over a frequency range corresponding to the signal frequencies transmitted, a cathode ray tube having two pairs of opposite control plates and a control grid, means connected to the output of said tuned circuit for applying the received signal pulses to the grid of said cathode ray tube, a first scanning wave voltage generator connected to one pair of plates of said cathode ray tube, a second scanning wave voltage generator having a frequency substantially greater than that of said first scanning wave voltage generator connected to the other pair of plates, and means for scanning the tuning of said tuned circuit over said frequency range at a speed synchronous with the frequency of said second scanning wave voltage generator.

14. The combination according to claim 13, in which each of said trigger circuits comprises a pair of pentodes one of which is biased to be normally conductive and the other of which is biased to be normally non-conductive, coupling means interconnecting the control grids of each tube with the anode of the other tube, said starting circuit including means for applying the timed negative pulses to the suppressor grid of the one normally conductive tube for rendering the same non-conductive and rendering the other tube conductive, the stopping circuit including means for applying the timed negative pulses to the suppressor grid of the other tube for rendering the same non-conductive and rendering the one tube conductive, the output circuit being connected to the control grid of the other tube.

15. In a system for the transmission and reception of intelligence, the combination of means for generating pulsed signals in accordance with the intelligence to be transmitted, comprising a plurality of trigger circuits each having a starting, stopping and output circuit, transmitting means connected to the outputs of said trigger circuits for transmitting the pulsed signals produced by the starting and stopping of said trigger circuits, and means controlling said trigger circuits, said means including means for deriving a plurality of sequentially timed negative pulses, switching means for applying said negative pulses to the starting and stopping circuits of the individual trigger circuits in accordance with the intelligence to be transmitted, said transmitting means including a plurality of gate tubes, one for each trigger circuit, means for controlling each gate tube by its corresponding trigger circuit and a plurality of high frequency oscillators, one connected to the input of each gate tube, the frequency of each oscillator being different whereby the pulse signals produced by each gate tube will be at a different frequency, and a receiver, said receiver including means converting the received pulsed signals into visual intelligence, a circuit tunable over the range of frequencies determined by said oscillator, means for scanning said tuned circuit over said frequency range, and in which said intelligence converting means is a cathode ray tube having two pairs of opposite beam controlling plates and a control grid, in combination with means connected to output of said tuned circuit for applying the received pulses to the grid of said cathode ray tube, a first scanning voltage generator connected to one pair of plates of said cathode ray tube, a second scanning voltage generator having a frequency substantially greater than that of said first scanning voltage generator, connected to the other pair of plates, and means for scanning the tuning of said tuned circuit over said frequency range at a speed synchronous with the frequency of said second scanning voltage generator.

16. The combination according to claim 8, in combination with means normally preventing operation of said trigger circuits despite energization thereof by said negative potential source, means for sequentially overcoming the operation-preventing means of each trigger circuit, and means synchronizing the action of said last sequentially acting means with the operation of said sequential switching means.

17. The combination according to claim 12, in combination with means normally rendering said trigger circuit inoperative, means for sequentially rendering said trigger circuits operative, and means for energizing said sequential means synchronously with the periodic energization of said negative potential source.

18. The combination according to claim 6, in which said negative pulse deriving means comprises a plurality of gas discharge tubes connected in cascade, with the last tube of the series connected with the first tube thereof, means responsive to energy conducted by one tube for extinguishing that tube and rendering the next succeeding tube conductive, whereby all of the said tubes become sequentially conductive one after the other, output circuits respectively connected to the anodes of each tube, whereby a negative pulse appears sequentially in said respective output circuits as each tube becomes conductive, and means initiating action of said gas discharge tubes.

19. In a system for the transmission of intelligence, a plurality of gas discharge tubes connected in cascade, with the last tube of the series connected with the first tube thereof, means responsive to energy conducted by one tube for extinguishing that tube and rendering the next succeeding tube conductive, whereby all of said tubes become sequentially conductive one after the other, output circuits respectively connected to the anodes of each tube, whereby negative pulses appear sequentially in the respective output circuits as each tube becomes conductive, a plurality of trigger circuits each having a starting, stopping and output circuit, common transmitting means connected to the outputs of said trigger circuits and adapted to be energized thereby, a keyboard having a plurality of keys provided with indicia thereon corresponding to a characted to be trismitted, a plurality of switch means controlled by said keys for interconnecting said output circuits with the starting and stopping circuits of said trigger circuits and thereby applying to them variously timed negative pulses in accordance with the character desired, and other switch means on said keyboard controlling the starting and stopping of the operation of gas discharge tubes.

20. In a system in which intelligence is transmitted by a plurality of sets of pulses, each set on a different frequency within a predetermined frequency band, the combination of a receiver having a circuit tunable over this frequency band, a cathode ray tube having two pairs of opposite control plates and a control grid, means connected to the output of said tunable circuit for controlling the energization of said control grid, a scanning voltage generator of a predetermined frequency connected to one pair of control plates of said cathode ray tube, a second scanning voltage generator of a frequency substantially greater than the frequency of the first voltage generator, connected to the other pair of control plates, and means for scanning the tuning of said tunable circuit at a speed synchronous with the frequency of said second scanning voltage generator.

EDMOND M. DELORAINE.
LOUIS A. DE ROSA.